(12) United States Patent
Reddy

(10) Patent No.: US 8,050,783 B2
(45) Date of Patent: Nov. 1, 2011

(54) SYSTEM AND METHOD FOR PRE-DISTORTING A DEVICE INPUT

(75) Inventor: Ajit Kumar Reddy, Matawan, NJ (US)

(73) Assignee: Pine Valley Investments, Inc., Las Vegas, NV (US)

( * ) Notice: Subject to any disclaimer, the term of this patent is extended or adjusted under 35 U.S.C. 154(b) by 570 days.

(21) Appl. No.: 11/717,486

(22) Filed: Mar. 12, 2007

(65) Prior Publication Data
US 2008/0228292 A1    Sep. 18, 2008

(51) Int. Cl.
*G06F 19/00* (2011.01)
*H03F 3/56* (2006.01)

(52) U.S. Cl. .......................................... 700/96; 330/45

(58) Field of Classification Search ............... 700/45, 700/96; 330/96, 45
See application file for complete search history.

(56) References Cited

U.S. PATENT DOCUMENTS

| | | | |
|---|---|---|---|
| 5,226,000 A * | 7/1993 | Moses et al. .................. | 708/313 |
| 5,519,603 A * | 5/1996 | Allbery et al. .................. | 700/4 |
| 5,524,286 A | 6/1996 | Chiesa et al. | |
| 5,598,436 A | 1/1997 | Brajal et al. | |
| 5,905,760 A | 5/1999 | Schnabl et al. | |
| 5,990,734 A * | 11/1999 | Wright et al. .................. | 330/2 |
| 6,043,707 A | 3/2000 | Budnik | |
| 6,125,266 A | 9/2000 | Matero et al. | |
| 6,147,553 A | 11/2000 | Kolanek | |
| 6,313,703 B1 * | 11/2001 | Wright et al. ................. | 330/149 |
| 6,449,465 B1 | 9/2002 | Gailus et al. | |
| 6,621,340 B1 | 9/2003 | Perthold et al. | |
| 6,834,084 B2 | 12/2004 | Hietala | |
| 2002/0098812 A1 | 7/2002 | Sourour et al. | |
| 2002/0186783 A1 | 12/2002 | Opas et al. | |
| 2002/0193085 A1 | 12/2002 | Mathe et al. | |
| 2003/0095608 A1 | 5/2003 | Duperray | |
| 2003/0215025 A1 | 11/2003 | Hietala | |
| 2003/0215026 A1 | 11/2003 | Hietala | |
| 2004/0021517 A1 | 2/2004 | Irvine et al. | |
| 2004/0047432 A1 | 3/2004 | Iwasaki | |
| 2004/0198257 A1 | 10/2004 | Takano et al. | |
| 2004/0208157 A1 | 10/2004 | Sander et al. | |
| 2005/0017801 A1 | 1/2005 | Bachman, II et al. | |
| 2005/0118965 A1 | 6/2005 | Tanabe et al. | |
| 2005/0122164 A1 | 6/2005 | Brandt et al. | |
| 2005/0156662 A1 * | 7/2005 | Raghupathy et al. .......... | 330/10 |
| 2007/0190952 A1 * | 8/2007 | Waheed et al. ............ | 455/114.3 |
| 2008/0143437 A1 * | 6/2008 | Mohamed Ahmed et al. . | 330/96 |

OTHER PUBLICATIONS

Nezami-M.K., "Fundamentals of Power Amplifier Linearization Using Digital Pre-Distortion" 2004 High Frequency Electronics Technical, Summit Technical Medial LLC p. 54-59.*

Abramchuk et al., "Generalized Interpolation Polynomials", 1997, Cybernetics and Systems Analysis, vol. 33, p. 66-76.*

Meijer-P.B.L., "Table Models for Device Modelling" 1998, Philips Research Lab, p. 1-4.*

* cited by examiner

*Primary Examiner* — Albert Decady
*Assistant Examiner* — Thomas Stevens
(74) *Attorney, Agent, or Firm* — Allen, Dyer, Doppelt, Milbrath & Gilchrist, P.A.

(57) ABSTRACT

A method for pre-distorting an input for a device is provided. A partial set of known data pairs is acquired during a closed-loop device calibration period. The partial set of known data pairs is searched for at least one missing data pair, and at least one data value is interpolated for the missing data pair. An augmented set of data pairs, including the known data pairs and the interpolated data value, is stored in a lookup table. During an open-loop operation period subsequent to the closed-loop device calibration period, the device input is pre-distorted based on the augmented set of data pairs stored in the lookup table.

26 Claims, 3 Drawing Sheets

SYSTEM AND METHOD FOR PRE-DISTORTING A DEVICE INPUT

FIELD OF THE INVENTION

The invention relates generally to digital data interpolation, and more particularly to interpolation of digital data for on-the-fly generation of lookup tables and pre-distortion of a device input.

BACKGROUND OF THE INVENTION

A control system utilizes a device or set of devices to regulate, direct or manage the behavior of systems or other devices. There are various types of control systems, including closed loop systems and open loop systems. Closed loop systems employ feedback, whereas open loop systems use prearranged schemes instead of feedback.

Control systems are used in a multitude of applications in electrical and electronic systems and devices. For example, control systems are used in wireless transmitters and receivers, speaker systems, televisions, computers, and many other applications. One function of control systems in these applications is to ensure that components, such as linear or non-linear devices, achieve a desired output. For example, a control system may be responsible for controlling the generation of an output signal with a specific power level and waveform quality corresponding to a specific input.

The design of control systems must account for specific requirements and standards that regulate the production, sale, and operation of electrical devices and equipment. For example, wireless standards such as Global System for Mobile communications (GSM), Enhanced Data Rates for GSM Evolution (EDGE), code division multiple access (CDMA), Universal Mobile Telecommunications System (UMTS), and many others include strict spectral requirements. As a result, electrical components must preserve waveform quality at various power levels to meet these strict requirements.

In nonlinear devices, such as power amplifiers as well as other devices, waveform quality typically increases with a more linear output response. However, some nonlinear devices operate more efficiently when the output response is nonlinear—for example, when a power amplifier approaches saturation. As a result, there is often a tradeoff between waveform quality and efficiency. For example, if a nonlinear device is set to operate in linear regions to meet quality standards or requirements, then power consumption and current drain may be degraded because the device is operating at a lower efficiency level. Alternatively, if a nonlinear device approaches saturation or starts to exhibit nonlinear qualities (which may improve efficiency), the waveform quality may be degraded and may not meet the specific requirements and standards.

To improve waveform quality from a nonlinear device operated near saturation, the input to the device may be pre-distorted to account for the nonlinearity of the device. For example, the device may be tested at the time of manufacturing to determine the its nonlinear response. Based on this measurement, an inverse pre-distortion function may be programmed into a lookup table associated with the device. During subsequent operation of the device, the lookup table may be used to pre-distort the device input to achieve a desired linear output. A potential disadvantage of this open-loop control is that the nonlinearities of the device may change over time. As a result, the pre-distortion function may no longer match the actual nonlinearities of the device, and the device may fail to provide the desired linear output.

Closed-loop control also may be used to pre-distort the device input to achieve a desired linear output. For example, a closed-loop approach may include a feedback loop to provide real-time information about the device output. Based on a comparison of actual device output and the desired output, the input signal may be adjusted by calculating a real-time pre-distortion function for the device input to achieve the desired linear output. This type of closed-loop control may continue to provide a desired linear output even if the nonlinearities of the device change over time. A potential disadvantage of this approach, however, is that it may increase power consumption due to the increased logic or circuitry required for the feedback loop and real-time calculation of the pre-distortion function.

Accordingly, there is a need for control systems and methods that provide reliable and efficient input pre-distortion for nonlinear devices. There is a further need for control systems and methods that provide for such reliable and efficient input pre-distortion even when the nonlinearities of a device change over time.

BRIEF SUMMARY

According to one aspect of the invention, there is a method for pre-distorting an input for a device. A partial set of known data pairs is acquired during a closed-loop device calibration period. The partial set of known data pairs is searched for at least one missing data pair, and at least one data value is interpolated for the missing data pair. An augmented set of data pairs, including the known data pairs and the interpolated data value, is stored in a lookup table. During an open-loop operation period subsequent to the closed-loop device calibration period, the device input is pre-distorted based on the augmented set of data pairs stored in the lookup table.

According to another aspect of the invention, there is a system for pre-distorting an input for a device. The system includes a feedback loop configured to detect an output of the device during a closed-loop device calibration period. A buffer is configured to temporarily store a set of known data pairs acquired during the calibration period. A lookup table is configured to store an augmented set of data pairs including the set of known data pairs and at least one interpolated data value associated with a missing data pair. A processor is in communication with the feedback loop, the buffer, and the lookup table. The controller is configured to sort the partial set of known data pairs temporarily stored in the buffer, to search for the missing data pair, and to interpolate the at least one interpolated data value. The controller is further configured to pre-distort the device input during an open-loop operation period subsequent to the closed-loop device calibration period, wherein the pre-distortion is based on augmented set of data pairs stored in the lookup table.

Other methods, apparatus, systems, features, and advantages of the invention will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PRESENTLY PREFERRED EMBODIMENTS

Embodiments of the invention include systems and methods for processing electromagnetic waves and signals, including transmitters, receivers, digital signal processors, modulators, filters, methods of transmission, modulation schemes, etc. The embodiments described in this application may be implemented in a wide range of applications, such as, for example, devices for communicating in accordance with a variety of standards, including Global System for Mobile communications and/or Enhanced Data Rates for GSM Evolution (GSM/EDGE), Wideband Code Division Multiple Access (WCDMA), Worldwide Interoperability for Microwave Access (WiMAX), etc.

Figure 1:
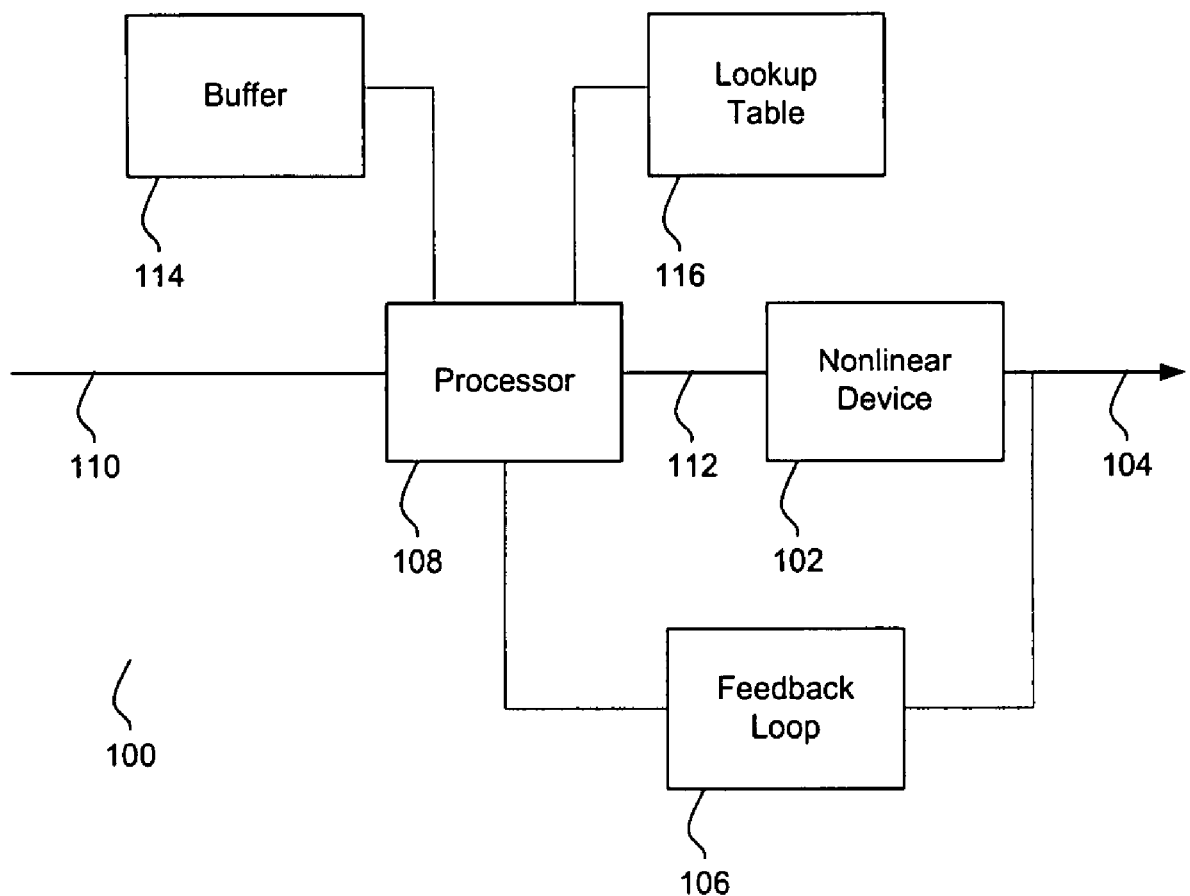
FIG. 1 is a block diagram illustrating a system for pre-distorting a device input according to one aspect of the invention.

FIG. 1 is a block diagram illustrating a system 100 for pre-distorting the input of a nonlinear device 102 according to one aspect of the invention. The system includes a feedback loop 106 configured to detect the output 104 of the nonlinear device 102 and provide a feedback signal to a processor 108. The processor 108 is configured to receive an original device input 110 and to generate a pre-distorted device input 112 designed to compensate for the nonlinear response of the device 102. For purposes of generating the pre-distorted input 112, the system also includes a buffer 114 and a lookup table 116 in communication with the processor. As a result of the pre-distortion, the system 100 is able to maintain a desired linearity at the output 104 of the nonlinear device 102.

During a calibration period, the processor acquires a set of known data pairs, each pair including two samples or data values. The first value may be an original input value, and the second value may be a pre-distorted input value selected to provide a desired linear device output. For example, in response to a particular original input value, the processor may be configured to sense the output from the device 104 via the feedback loop 106, calculate the difference between the actual device output and a desired device output, and then determine how the same input value could be pre-distorted to achieve the desired linear output value. The processor may then associate the determined pre-distorted input value with the original input value as a known data pair.

Alternatively, each data pair may include an original input value and a pre-distortion parameter that may be used to adjust the original input value to achieve the desired linear device output. For example, a pre-distortion parameter may be an offset that is added to the original input value, a factor that is multiplied by the original input value, or any other suitable parameter to adjust the original input value.

The calibration period during which this acquisition of known data pairs takes place may involve processing a specific set of original input values designed to produce a particular set of known data pairs. Alternatively, the processor may leverage a standardized calibration or startup routine to acquire the known data pairs. For example, in a GSM/EDGE implementation, a standard ramp-up period may be used as the calibration period to acquire known data pairs. Because the data acquisition is performed during the closed-loop calibration period based on feedback from the actual device output, the acquired data reflects the current nonlinearity of the device 102 at the time of calibration. In addition, the calibration process may be performed periodically to account for changes in the nonlinearity of the device 102.

The set of known data pairs acquired during the calibration period may not be complete. There may be data pairs missing from the set. For example, the original input signal 110 processed during the calibration period may not involve every possible original input value. This results in holes in the set of known data pairs. The processor may be configured to interpolate or extrapolate one or more data values to fill these holes.

To identify missing data values, the processor 108 temporarily stores the known data pairs in the buffer 114. The processor 108 may then sort the known data pairs and search for holes in the data set. Once a hole has been identified, the processor 108 may interpolate or extrapolate a data value to fill the hole based on the other known data values. In this way, the processor 108 augments the set of known data values with interpolated or extrapolated data. The processor 108 stores the augmented set of data pairs in the lookup table 116.

After the calibration period is complete, the feedback loop 106 is disabled and the system 100 operates in an efficient open-loop operational mode. In this mode, the processor 108 pre-distorts the input to the device 102 through use of the data pairs stored in the lookup table 116. In response to a particular original input data value in the original input 110, the processor 108 accesses the corresponding pre-distorted input value from the lookup table 116. The processor provides the corresponding pre-distorted input value to the device 102 as part of the pre-distorted device input 112. As a result, the device 102 provides the desired linear output value at the device output 104.

Figure 2:
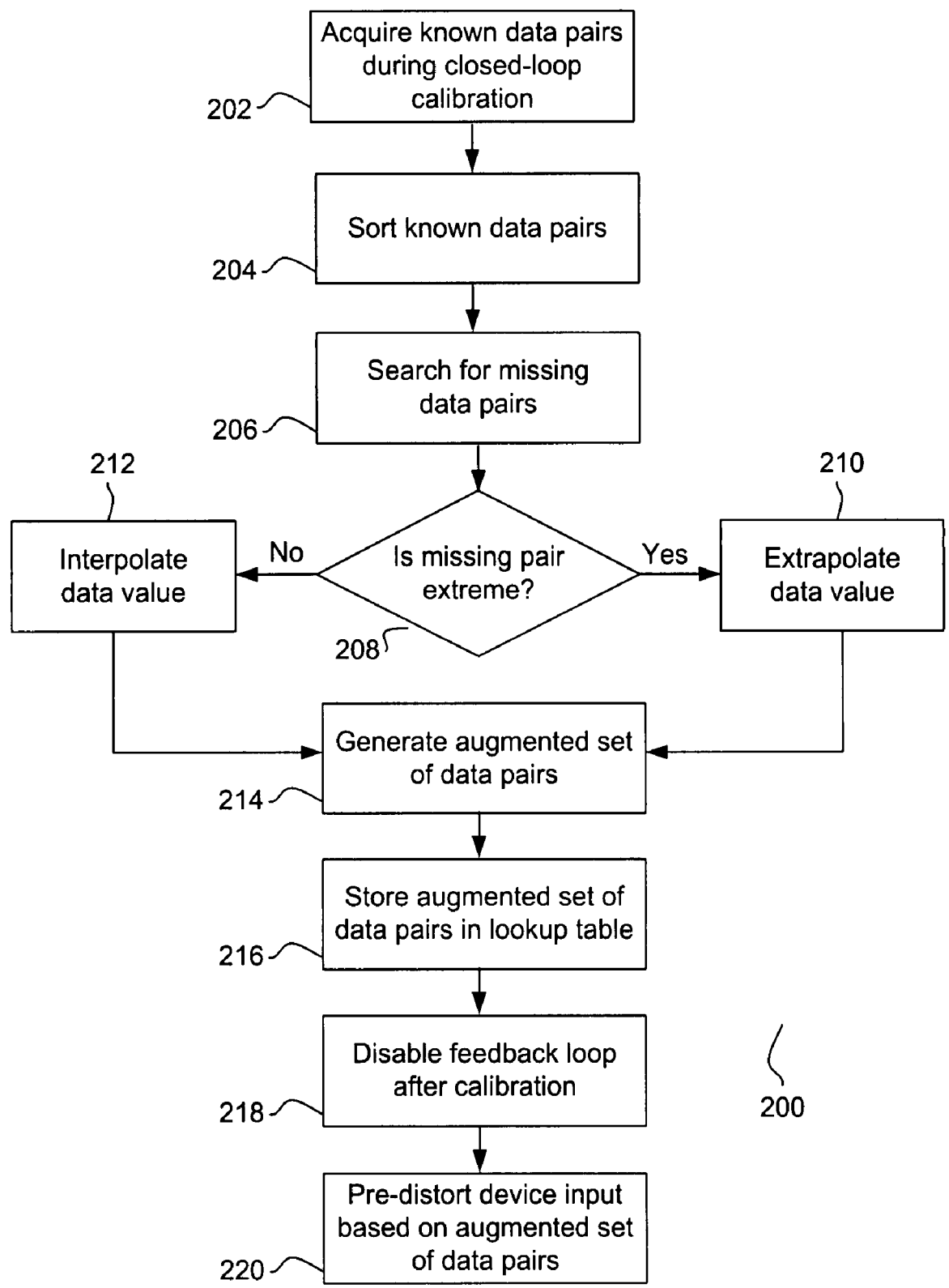
FIG. 2 is a flow diagram illustrating a method for pre-distorting a device input according to another aspect of the invention.

FIG. 2 is a flow diagram illustrating a method 200 for pre-distorting a device input according to another aspect of the invention. A set of known data pairs is acquired 202 during a closed-loop calibration period. For example, known data pairs may be acquired in the manner described above with reference to FIG. 1. The known data pairs are then sorted 204, and a search 206 is conducted for missing data pairs, also known as holes in the data. When a missing data pair is identified, it is determined 208 whether or not the missing data pair is an extreme. A missing data pair is an extreme if it falls outside the range of values of known data pairs. If the missing data pair is an extreme, then a data value may be extrapolated 210 based on the values of known data pairs to fill the hole. If the missing data pair is not an extreme, then a data value is interpolated 212 based on other known data values to fill the hole. As an alternative, the method 200 may fill holes in the known data pairs only through interpolation, not extrapolation. In this case, there would be no attempt to fill holes resulting from extreme missing data pairs.

An augmented set of data pairs is generated 214. The augmented set of data pairs includes the known data pairs and one or more interpolated or extrapolated data values. The augmented set of data pairs is stored 216 in a lookup table. Once the calibration period is complete, the feedback loop may be disabled 218 for increased power efficiency. The input of the device is then pre-distorted 220 based on the augmented set of data pairs stored in the lookup table.

The interpolation of the data values described above may be performed in a variety of ways. For example, linear interpolation may be used to interpolate missing data pairs in two vectors, X and Y. The vector X consists of samples $x_i$, such that the acquired samples belong to the set of non-negative integers ranging between 0 to $2^N-1$, where N is the bit width of the acquisition data path of the samples of the vector X. The vector Y consists of the acquired samples $y_i$, such that each of the samples belongs to the vector Y, which is a set of integers ranging between $2^M$ to $2^M-1$, where M is the bit width of the acquired data path of vector Y. The samples $y_i$, in the vector Y are obtained as a function of samples $x_i$ of the vector X such that $y_i=f(x_i)$ where "i" is the sampling instance.

A subset of the data in vectors X and Y are collected at the sampling frequency $F_s$ and stored in a buffer. During the acquisition process, certain samples $x_i$ may be missed, along with the corresponding samples $y_i$, hence providing the need to interpolate for the missing samples with the given set of data as the X and Y vectors. The vectors X and Y may be irregular, which means that the number of samples missing between the collected samples may be different or irregularly spaced. The processing of data and interpolation for these irregularly spaced samples may be carried out in real time at the same or a different sampling frequency.

The sample $x_i$ denotes the independent variable for the $i^{th}$ acquisition, and $y_i=f(x_i)$ is the corresponding value of the dependent variable. The collected data D can then be represented as a set of data pairs:

$$D \triangleq \{(x_i, y_i) | 0 \le i \le N-1\} \quad (1)$$

D is defined to be the set of points $(x_i, y_i)$ with i ranging from 0 to N-1. The N×1 vector X is a vector of independent variables and the N×1 vector Y is a vector of dependent variables. The independent variables may be sorted such that $x_0 < x_1 < \ldots < x_n$.

One way to fit a curve to the data D is to find the function $f(x)$ such that $$y_i=f(x_i), 0 \le i \le N-1 \quad (2)$$

Once a function is determined that satisfies equation (2), the value of y at points other then the samples can be evaluated. If x lies in the interval $[x_k, x_{k+j}]$ then $y=f(x)$ can be evaluated. The process of determining y is referred to as interpolation which is a process of approximating two known data points. In the case where x is outside the known interval then the corresponding y value could still be determined, and this process is referred to as extrapolation. Thus interpolation is a process which fills in measurements while extrapolation tends to approximate the value beyond the range of the collected information or data. Different forms of interpolation exist such as piecewise-linear interpolation, interpolation by the use of polynomials, cubic interpolation, look-up tables (LUT), etc. The interpolation discussed herein is piecewise-linear interpolation, but other interpolation methods could also be used. In the case of piecewise-linear interpolation a straight line segment is used between each adjacent pair of data points. The virtue of this type of interpolation lies in the fact that the function $f(x)$ can be expressed in closed form. Suppose (x,y) represents a point on the line segment connecting the point $(x_k, y_k)$ to $(x_{k+1}, y_{k+1})$ then using similar triangles and setting the ratios of the two sides equal we get, $$\frac{y-y_k}{x-x_k} = \frac{y_{k+1}-y_k}{x_{k+1}-x_k}, \quad 0 \le k \le S-1 \quad (3)$$

In equation (3), it is assumed that S<N. If $f_k(x)$ denotes the value for y between the points k and k+1, then solving equation (3) for y yields the following interpolation function for the data segment k.

$$f_k(x) = y_k + \frac{y_{k+1}-y_k}{x_{k+1}-x_k}(x-x_k), \quad 0 \le k \le S-1 \quad (4)$$

If x<S then the corresponding dependent variable y is obtained by interpolation, if x≧S, but less than a known finite value N, then the corresponding y value is obtained by extrapolation. For example, a missing data value $y_k$ may be determined using the equation $$y_k=y_{k-1}+dy/dx*(x_k-x_{k-1}) \quad (5)$$

Figure 3:
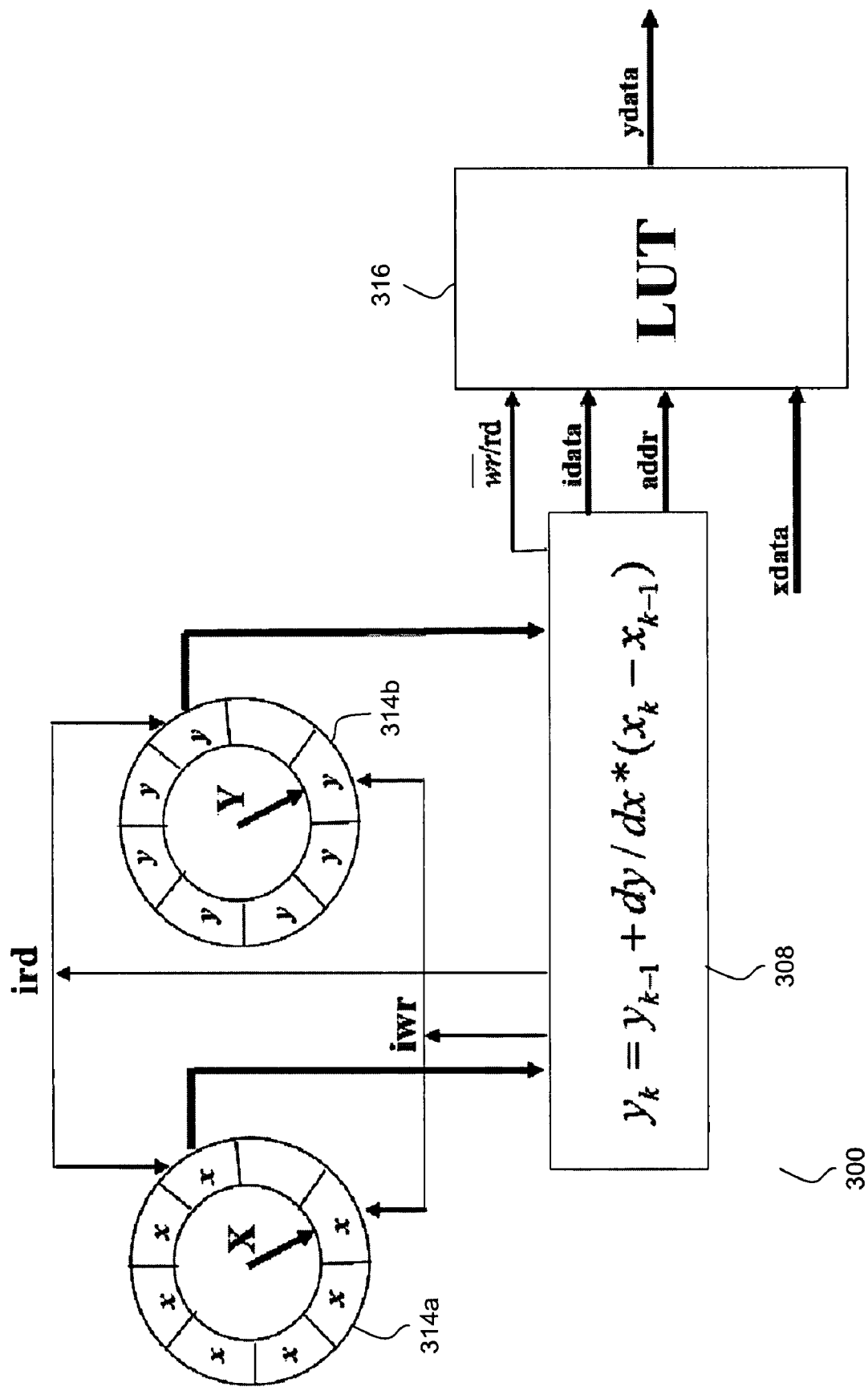
FIG. 3 is a block diagram illustrating a system for pre-distorting a device input according to another aspect of the invention.

FIG. 3 is a block diagram of a system 300 for pre-distorting a device input according to another aspect of the invention. The system 300 uses Equation 5 to determine a data value for a missing data pair, although other interpolation or extrapolation methods also may be used. The system 300 includes a processor 308. The processor 308 is configured to receive an original device input X and to generate a pre-distorted device input Y designed to compensate for the nonlinear response of the device (not shown in FIG. 3). Alternatively, Y may be a pre-distortion parameter used to adjust the original input value X to achieve the desired linear device output. For example, a pre-distortion parameter Y may be an offset that is added to the original input value X, a factor that is multiplied by the original input value X, or any other suitable parameter to adjust the original input value X.

For purposes of generating the pre-distorted input Y, the system also includes two circular buffers 314a, 314b and a lookup table 316 in communication with the processor 308. The processor 308 uses signals iwr and ird to control operations for writing to and reading from the circular buffers 314a, 314b. The processor uses signals wr/rd, idata, and addr to control operations for writing to and reading from the lookup table 316. As a result of the pre-distortion, the system 300 is able to maintain a desired linearity at the output of the nonlinear device.

During a calibration period, the processor acquires a set of known data pairs, each pair including an X value and a Y value. For example, the data acquisition may be performed as described above with respect to FIG. 1. As described above, the set of known data pairs acquired during the calibration period may not be complete. This results in holes in the set of known data pairs.

To identify missing data values, the processor 308 temporarily stores values of at least some of the known data pairs in the buffers 314a, 314b. As illustrated, the X values may be stored in the first circular buffer 314a, and the Y values may be stored in the second circular buffer 314b. The processor 308 may then sort the known data pairs and search for holes in the data set. For example, the processor may sort the known data pairs in order of their X values. Once a hole has been identified, the processor 308 determines a data value to fill the hole using Equation 5. In this way, the processor 308 augments the set of known data values with interpolated or extrapolated data. The processor 308 stores the augmented set of data pairs in the lookup table 316.

After the calibration period is complete, the values in the lookup table 116 are used to pre-distort the device input. In response to a particular original input data value $x_i$, the corresponding pre-distorted input value $y_i$ (or a pre-distorted input value determined from a pre-distortion factor $y_i$) is provided from the lookup table 316. Because a complete set of Y values has been assembled during the calibration period through collection, interpolation, and/or extrapolation, the lookup table 316 can be used to reliably pre-distort the device input for a desired linear output in an efficient open-loop operating mode.

The methods and systems of the present invention may be realized in software, hardware, or a combination of software and hardware. Any type of computing system or other apparatus adapted for realizing the methods described herein is suitable. In the present context, a program may include any expression, in any language, code or notation, of a set of instructions intended to cause a system having an information processing capability to perform a particular function. It is intended that the foregoing detailed description be regarded as illustrative rather than limiting, and that it be understood that the following claims, including all equivalents, are intended to define the scope of this invention.

The invention claimed is:

1. A method for pre-distorting an input for a device, comprising:
   acquiring a set of data pairs during a closed-loop calibration period of the device;
   searching the set of data pairs for at least one missing data pair;
   interpolating at least one interpolated data value for the at least one missing data pair;
   storing an augmented set of data pairs in a lookup table, wherein the augmented set of data pairs includes the set of data pairs and the at least one interpolated data value; and
   pre-distorting the device input during an open-loop operation period subsequent to the closed-loop calibration period of the device, wherein the pre-distortion is based on the augmented set of data pairs stored in the lookup table;
   wherein each of the data pairs comprises an original input value and a corresponding pre-distorted input value;
   wherein the interpolated data value is a pre-distorted input value $y_k$ corresponding to a $k^{th}$ data pair, wherein k is an indexing variable; and
   interpolating the interpolated data value according to an equation $$y_k = y_{k-1} + dy/dx*(x_k - x_{k-1})$$

wherein $x_k$ is the original input value for the $k^{th}$ data pair.

2. The method of claim 1, wherein the set of data pairs is sorted in order of original input value.

3. The method of claim 1, wherein the set of data pairs is temporarily stored in at least one circular buffer.

4. The method of claim 1, wherein:
   each of the data pairs further comprises a first value and a second value;
   the first values are temporarily stored in a first buffer; and
   the second values are temporarily stored in a second buffer.

5. The method of claim 1, further comprising:
   identifying a missing data pair that exceeds a range of the set of data pairs; and
   extrapolating at least one extrapolated data value for the at least one missing data pair.

6. The method of claim 1, wherein:
   the device comprises a phase modulator; and
   each of the original input values comprises an original input phase value and each of the pre-distorted input values comprises a corresponding pre-distorted input phase value.

7. The method of claim 1, wherein:
   the device comprises an amplitude modulator; and
   each of the original input values comprises an original input amplitude value and each of the pre-distorted input values comprises a corresponding pre-distorted input amplitude value.

8. A system for pre-distorting an input for a device, comprising:
   a feedback loop configured to detect an output of the device during a closed-loop calibration period of the device;
   a buffer configured to temporarily store a set of data pairs acquired during the closed-loop calibration period of the device;
   a lookup table configured to store an augmented set of data pairs including the set of data pairs and at least one interpolated data value associated with at least one missing data pair; and
   a processor in communication with the feedback loop, the buffer, and the lookup table, wherein the processor is configured to sort a partial set of data pairs temporarily stored in the buffer, to search for the at least one missing data pair, to interpolate the at least one interpolated data value, and to pre-distort the device input during an open-loop operation period subsequent to the closed-loop calibration period of the device, wherein the pre-distortion is based on the augmented set of data pairs stored in the lookup table;
   each data pair of the set thereof comprising an original input value and a corresponding pre-distorted input value;
   the at least one interpolated data value being a pre-distorted input value $y_k$ corresponding to a $k^{th}$ data pair, wherein k is an indexing variable; and
   the processor being further configured to interpolate the interpolated data value according to the equation $$y_k = y_{k-1} + dy/dx*(x_k - x_{k-1})$$

wherein $x_k$ is the original input value for the $k^{th}$ data pair.

9. The system of claim 8, wherein the processor is further configured to sort the set of data pairs in order of original input value.

10. The system of claim 8, wherein the buffer further comprises at least one circular buffer.

11. The system of claim 8, wherein:
    each data pair of the set thereof further comprises a first value and a second value; and
    the buffer further comprises a first buffer configured to temporarily store the first values and a second buffer configured to temporarily store the second values.

12. The system of claim 8, wherein the processor is further configured to identify at least one missing data pair that exceeds a range of data pairs and to extrapolate at least one extrapolated data value for the at least one missing data pair that exceeds the range of data pairs.

13. The system of claim 8, wherein:
    the device comprises a phase modulator; and
    each of the original input values comprises an original input phase value and each of the pre-distorted input values comprises a corresponding pre-distorted input phase value.

14. The system of claim 8, wherein:
    the device comprises a phase modulator; and
    each of the original input values comprises an original input amplitude value and each of the pre-distorted input values comprises a corresponding pre-distorted input amplitude value.

15. A method for pre-distorting an input for a device, comprising:
  acquiring a set of data pairs during a closed-loop calibration period of the device, and temporarily storing the set of data pairs in at least one circular buffer;
  searching the set of data pairs for at least one missing data pair;
  interpolating at least one interpolated data value for the at least one missing data pair;
  storing an augmented set of data pairs in a lookup table, wherein the augmented set of data pairs includes at least the set of data pairs and the at least one interpolated data value; and
  pre-distorting the device input during an open-loop operation period subsequent to the closed-loop calibration period of the device, wherein the pre-distortion is based on the augmented set of data pairs stored in the lookup table.

16. The method of claim 15, wherein each data pair of the set thereof further comprises an original input value and a corresponding pre-distorted input value.

17. The method of claim 15, wherein the set of data pairs is sorted in order of original input value.

18. The method of claim 15, wherein each data pair of the set thereof further comprises an original input value and a corresponding pre-distortion parameter.

19. The method of claim 15, wherein:
  the device comprises a phase modulator; and
  each data pair of the set thereof further comprises an original input phase value and a corresponding pre-distorted input phase value.

20. The method of claim 15, wherein:
  the device comprises an amplitude modulator; and
  each data pair of the set thereof further comprises an original input amplitude value and a corresponding pre-distorted input amplitude value.

21. A system for pre-distorting an input for a device, comprising:
  a feedback loop configured to detect an output of the device during a closed-loop calibration period of the device;
  at least one circular buffer configured to temporarily store a set of data pairs acquired during the closed-loop calibration period of the device;
  a lookup table configured to store an augmented set of data pairs including the set of data pairs and at least one interpolated data value associated with at least one missing data pair; and
  a processor in communication with the feedback loop, the at least one circular buffer, and the lookup table, wherein the processor is configured to sort a partial set of data pairs temporarily stored in the at least one circular buffer, to search for the at least one missing data pair, to interpolate the at least one interpolated data value, and to pre-distort the device input during an open-loop operation period subsequent to the closed-loop calibration period of the device, wherein the pre-distortion is based on the augmented set of data pairs stored in the lookup table.

22. The system of claim 21, wherein each data pair of the set thereof further comprises a original input value and an corresponding pre-distorted input value.

23. The system of claim 21, wherein the processor is further configured to sort the set of data pairs in order of original input value.

24. The system of claim 21, wherein each data pair of the set thereof further comprises an original input value and a corresponding pre-distortion parameter.

25. The system of claim 21, wherein:
  the device comprises a phase modulator; and
  each data pair of the set thereof further comprises an original input phase value and a corresponding pre-distorted input phase value.

26. The system of claim 21, wherein:
  the device comprises an amplitude modulator; and
  each data pair of the set thereof further comprises an original input amplitude value and a corresponding pre-distorted input amplitude value.

* * * * *